US011480150B2

(12) United States Patent
Cortiana

(10) Patent No.: US 11,480,150 B2
(45) Date of Patent: Oct. 25, 2022

(54) COMPUTER-IMPLEMENTED METHOD FOR RE-CALIBRATING AT LEAST ONE YAW-ANGLE OF A WIND TURBINE, RESPECTIVE SYSTEM, COMPUTER-IMPLEMENTED METHOD FOR WIND PARK OPTIMIZATION, AND RESPECTIVE WIND PARK

(71) Applicant: RWE RENEWABLES INTERNATIONAL GMBH, Essen (DE)

(72) Inventor: Giorgio Cortiana, Essen (DE)

(73) Assignee: RWE RENEWABLES INTERNATIONAL GMBH, Essen (DE)

( * ) Notice: Subject to any disclaimer, the term of this patent is extended or adjusted under 35 U.S.C. 154(b) by 214 days.

(21) Appl. No.: 16/625,959

(22) PCT Filed: Jun. 28, 2018

(86) PCT No.: PCT/EP2018/067363
§ 371 (c)(1),
(2) Date: Dec. 23, 2019

(87) PCT Pub. No.: WO2019/002439
PCT Pub. Date: Jan. 3, 2019

(65) Prior Publication Data
US 2020/0166016 A1      May 28, 2020

(30) Foreign Application Priority Data

Jun. 29, 2017 (DE) .......................... 102017114583.4

(51) Int. Cl.
*F03D 7/04* (2006.01)
*F03D 7/02* (2006.01)
*F03D 17/00* (2016.01)

(52) U.S. Cl.
CPC ........... *F03D 7/0204* (2013.01); *F03D 7/048* (2013.01); *F03D 17/00* (2016.05)

(58) Field of Classification Search
CPC ......... F03D 7/048; F03D 7/0204; F03D 17/00
See application file for complete search history.

(56) References Cited

U.S. PATENT DOCUMENTS 9,201,410 B2 * 12/2015 Ambekar ............... G05B 13/04
9,617,975 B2 *  4/2017 Attia ...................... F03D 7/0204
(Continued)

FOREIGN PATENT DOCUMENTS

CL      2017001384 A1     2/2018
EP         2949924 A1    12/2015
(Continued)

OTHER PUBLICATIONS

International Search Report dated Sep. 18, 2018 from corresponding PCT Application No. PCT/EP2018/067363.

*Primary Examiner* — Justin D Seabe
(74) *Attorney, Agent, or Firm* — Grogan, Tuccillo & Vanderleeden, LLP

(57) ABSTRACT

To solve the problem of a mis-calibration of a wind turbine a computer-implemented method for re-calibrating at least one yaw-angle of a wind turbine starting from an initial yaw-angle calibration of said wind turbine, based on determining a turbulence intensity estimation value (20) related to said appropriate yaw-angle (10), wherein the turbulence intensity (TI) being a ratio of wind speed deviation to average wind speed over a pre-determined period of time. Further, to solve the problem of a mis-calibration of a wind turbine a system for re-calibrating at least one yaw-angle of a wind turbine based on above re-calibration method. Further, to solve the problem of a management of a wind park below optimum a computer-implemented method for wind park optimization based on simulation calculation including (Continued)

turbulence intensity estimation values (20) estimating said at least one effecting wind turbine (101,102,103) to suffer from wake from said at least one effected wind turbine (100,101, 102). Further, to solve the problem of a management of a wind park below optimum a wind park, including a management system for optimizing that wind park based on above optimization method. Moreover, present invention relates to a computer-readable medium comprising such methods.

8 Claims, 7 Drawing Sheets

(56) References Cited

U.S. PATENT DOCUMENTS

| | | | |
|---|---|---|---|
| 9,644,612 B2* | 5/2017 | Evans | H02J 3/381 |
| 10,100,813 B2* | 10/2018 | Ravindra | F03D 7/048 |
| 10,138,873 B2* | 11/2018 | Gregg | F03D 17/00 |
| 10,794,360 B2* | 10/2020 | Arlaban Gabeiras | F03D 7/043 |
| 11,073,133 B2* | 7/2021 | Zheng | F03D 7/043 |
| 2017/0022974 A1* | 1/2017 | Roma | F03D 17/00 |
| 2018/0058426 A1* | 3/2018 | Kondou | F03D 7/0204 |

FOREIGN PATENT DOCUMENTS

| | | |
|---|---|---|
| EP | 3106660 A1 | 12/2016 |
| EP | 3121442 A1 | 1/2017 |
| JP | 2015161172 A | 9/2015 |
| WO | 2016065594 A1 | 5/2016 |

* cited by examiner

COMPUTER-IMPLEMENTED METHOD FOR RE-CALIBRATING AT LEAST ONE YAW-ANGLE OF A WIND TURBINE, RESPECTIVE SYSTEM, COMPUTER-IMPLEMENTED METHOD FOR WIND PARK OPTIMIZATION, AND RESPECTIVE WIND PARK

CROSS REFERENCE TO RELATED APPLICATIONS

This application is a National Stage of International Application No. PCT/EP2018/067363 filed on Jun. 28, 2018 which claims priority to German Application No. 10, 2017 114583.4 filed on Jun. 29, 2017 which are incorporated herewith in their entireties.

TECHNICAL FIELD OF THE INVENTION

The present invention relates generally to a computer-implemented method for re-calibrating at least one yaw-angle of a wind turbine starting from an initial yaw-angle calibration of said wind turbine, a system for re-calibrating at least one yaw-angle of a wind turbine, a computer-implemented method for wind park optimization, a wind park, including a management system for optimizing that wind park, and a computer-readable medium comprising such methods.

BACKGROUND OF THE INVENTION

Wind parks are places where many wind turbines having power generators for producing electrical power by winds on the land or sea are installed. The wind parks have been widely studied/commercialized all over the world including Germany, U.S., Denmark, and other countries.

The wind park should generate and provide power demanded by a system operator, and should be run to meet the system-related standards. In addition, it is important to maximize electrical power production within a range allowed by the system operator.

Furthermore, it is necessary to minimize electrical power production cost by minimizing mechanical load of power generation equipment and reduce maintenance cost.

A wind turbine comprises a tower and, in an elevated position, a rotor being arranged to be rotated by on-coming wind. For that the rotor comprises a plurality of rotor blades, usually three, being fixed to a rotor hub at the center of the rotor. The rotor hub at its back side is fixed to a generator shaft to transmit a turning moment to a generator. The rotor is fixed in such a way that it is rotatable to a vertical axis. In many cases, the generator is housed fixed to the rotor in a so-called nacelle. As such, the generator and nacelle are being rotated together with the rotor. This rotation is called yawing and is usually perpendicular to the rotor's rotation axis.

Wind direction and correct alignment of the rotor's rotation axis is an important factor to achieve high electrical power production efficiencies. Once a wind turbine is erected, its yaw-angle will be initially calibrated to a true alignment orientation. For the rotor hub's front side heading North direction, the yaw-angle value is set to 0° and 360°, 90° for East direction, 180° for South direction and 270° for West direction. Wind directions are defined by the direction from which the wind originates, so that according to above example for a single wind turbine without being influenced by side effects for North wind will show best performance at 0° and for East wind at 90° and so on. As for most wind turbines, the nacelle is yawing with the alignment movement; the yaw-angle is also described as nacelle direction.

It is not unusual that the calibrated yaw-angle after some time in operation or due to an accident or (temporary) measurement system dysfunction deviates from the actual alignment of the rotor axis. According to the prior art, once this being detected a maintenance team has to climb the respective wind turbine and to manually re-calibrate the yaw-angle value. This is very time-consuming and expensive. Moreover, the wind turbine will have to operate at a lower performance or even be switched off until the maintenance team finds time to do so. A maintenance team is usually not permanently based at a single wind park. Furthermore, slight deviations from a proper calibration may not be detected or accepted, as cost for re-calibration may exceed the loss by impaired performance.

In EP 2 949 924 A1 according to claim 1, a method is proposed to compare two associated wind turbines included within the wind park using estimated wake features for the associated wind turbines with historical performance data related to the associated wind turbines. Based on that, identifying a variance between the estimated wake features and the current wake features, a re-calibration factor for at least one of the associated wind turbines based on the identified variance is determined. According to par. [0015], "wake effects" refers to a change in the flow of wind or air due to the wind flowing past a wind turbine. Thus, wake effects result in decreased wind to downstream wind turbines. According to par. [0016], "wake feature" refers to production data for wind turbines that are upstream or downstream from one another indicating that one turbine is causing wake effects on the other turbines. Such is a peak or a trough in a production output ratio.

Therefore, according to EP 2 949 924 A1 the data of at least two wind turbines are required. Furthermore, as explained in detail with respect to FIGS. 10 and 11 in pars. [0070] to [0074], this method cannot find a re-calibration result in which the initial calibration is out-performed, but only corrects the nacelle direction to be back to the initial calibration, as it relies on historical data (cf. Claim 1).

SUMMARY OF THE INVENTION

To address the above-discussed deficiencies of the prior art, it is a primary aspect of the present invention to provide a computer-implemented method for re-calibrating at least one yaw-angle of a wind turbine starting from an initial yaw-angle calibration of said wind turbine, the method comprising at least the following steps:

a. receiving wind data;
b. based on at least said wind data:
calculating an appropriate yaw-angle, and
determining a turbulence intensity estimation value related to said appropriate yaw-angle, wherein the turbulence intensity (TI) being a ratio of wind speed deviation to average wind speed over a pre-determined period of time;
c. instructing said wind turbine to align according to said calculated yaw-angle;
d. after attainment of said yaw-angle alignment, retrieving wind turbine specific wind speed data;
e. based on said retrieved wind turbine specific wind data, calculating a turbulence intensity detection value;
f. comparing said turbulence intensity detection value with said turbulence intensity estimation value and calculating a turbulence intensity deviation value;

g. if said turbulence intensity deviation value is above a pre-determined deviation threshold, searching a matching yaw-angle having a turbulence intensity estimation value that matches with said turbulence intensity detection value;

h. if a matching yaw-angle is found, instructing said wind turbine to align according to that matching yaw-angle.

Contrary to any previously known methods for re-calibration of wind turbine yaw-angle information from another wind turbine, in particular, orientation information of that other wind turbine, is not required. In particular, the wake effect of another turbine is not necessary for re-calibrating a yaw-angle of a wind turbine. Moreover, historical data is not compulsory for re-calibrating the yaw-angle of a wind turbine. Nonetheless, such data may be used for improvement of the performance or for reassuring correct results of the provided methods, in particular, the methods as provided by EP 2 949 924 A1 may be additionally used for wind park optimization.

However, in fact an initial (rough) calibration is necessary, at least to roughly know the yaw-angle is not reversed and into which direction a yaw-angle correction should be applied.

First, wind data is received. Wind data absolutely required for carrying out the proposed method is the wind speed and wind direction. In step b. based on a simulation an appropriate yaw-angle is being estimated. For that particular yaw-angle a turbulence intensity estimation value is being determined based on a simulation or previously sensed, calculated and stored data. The turbulence intensity (TI) is the ratio of wind speed deviation, e.g. standard deviation, to average wind speeds over a predetermined period of time, for example 10 minutes, to mitigate cross effects and, in particular, to distinguish gust-caused speed deviations from speed deviations caused by a rather static situation, such as landscape effects and wake influence from a neighboring wind turbine.

Subsequently, in step c. that particular wind turbine is aligned to that appropriate yaw-angle calculated in step b.

As attaining that new yaw-angle might take some time—not before the wind turbine having arrived at the new yaw-angle, and further the wind turbine specific wind speed data is retrieved. If the calibration is correct, the turbulence intensity is—within a turbulence intensity deviation threshold—identical with the turbulence intensity estimation value. In that case the new yaw-angle alignment is assumed to be correct.

However, calibration is assumed to be incorrect, if at the attainment of new yaw-angle alignment the turbulence intensity detection value based on the wind turbine specific wind speed data results in a deviation value exceeding a predetermined deviation threshold, i.e. being much lower or being much higher than the determined turbulence intensity estimation value.

An orientation of turbulence intensity peaks is a general intrinsic property of wind turbines, although the angle width and intensity of turbulences may vary. Therefore, a matching yaw-angle corresponding to a turbulence intensity estimation value that matches—within the pre-determined deviation value—with said turbulence intensity detection value can usually be found. If such matching yaw-angle cannot be found, this is probably caused by a defect of the rotor and/or wind sensors or an insufficient amount of data for a turbulence intensity estimation value. As soon as a matching yaw-angle is found the wind turbine is turned/adjusted to align according to that matching yaw-angle.

In conclusion, it is not necessary to arrive at the initial calibration, but a new calibration of the alignment of the rotor may be arrived at. However, in particular, yaw-angle alignment to an in detail unknown wind direction may be achieved. In particular, landscape effects on unexpected wake effects, such as from neighboring wind turbines, do not have to be known factors to arrive at best performance re-calibration for that particular yaw-angle appropriate to the present wind direction and wind speed. This also means that it is possible to re-calibrate a wind turbine if wind data is received in step a. from a point not too close to the wind turbine, e.g. from a met mast. However, to the contrary it may also be sufficient to receive wind data in step a. from the wind turbine and, respectively, when sensors mounted on the wind turbine, without any outside information. However, also a variety of geographical locations for measuring wind data may be used, for example to receive pseudo-mast data (cf. below).

According to an embodiment of the method further comprises the following steps:

storing said matching yaw-angle as replacement yaw-angle for said appropriate yaw-angle calculated in step a. in a look-up table, and for an operation condition of said wind turbine, where that same appropriate yaw-angle is calculated as being appropriate, instructing said wind turbine to align according to that replacement yaw-angle.

Now and for future yaw-angle calculations it is advantageous to replace the (initial) yaw-angle by a replacement yaw-angle based on the assumption that the re-calibrated wind turbine is now correctly aligned with that replacement yaw-angle. Therefore, the wind turbine will align as fast as being calibrated correctly at machine side.

According to an embodiment of the method further comprises the following steps:

after having retrieved at least one turbulence intensity detection value for a plurality of distinct yaw-angles each, mapping these turbulence intensity detection values and comparing them to mapped turbulence intensity estimation values;

if one turbulence intensity detection value matches with a turbulence intensity estimation value, calculating a deviation angle between the yaw-angle related to the turbulence intensity detection value and the yaw-angle related to turbulence intensity estimation value;

applying said deviation angle to the entire mapped turbulence intensity estimation values and newly associating them to corresponding new result yaw-angles being each the sum of estimated yaw-angle and said deviation angle;

comparing at least some of the plurality of mapped turbulence intensity detection values with that mapped turbulence intensity estimation value being newly associated to the respective result yaw-angle;

if a pre-determined number of said plurality of mapped turbulence intensity detection values is within a mapping threshold, storing that deviation angle and adding that deviation angle to each appropriate yaw-angle calculated in step b. and instructing said wind turbine based on the new result yaw-angle.

Mapping data means that turbulence intensity detection values are stored in connection with the specific angle for optimization and maintenance purposes. Stored data may be displayed or printed on a polar diagram resulting in a turbulence intensity value profile. However, these turbulence intensity values may rather be stored in a table for machine reading purposes.

In the matching process for one turbulence intensity estimation value preferably the presently required turbulence estimation value is compared to the detected turbulence intensity detection value. The respective yaw-angle according to the estimation value and said yaw-angle according to the matching estimation value deliver the deviation angle. An advantage of this matching process is that the deviation threshold may be set narrower than for comparing only a single turbulence intensity detection value with a number of turbulence intensity estimation values. This is because having a plurality of turbulence intensity detection values the probability rises to arrive at a correct re-calibration even if a relatively high deviation between the turbulence intensity detection value(s) and matching turbulence intensity estimation value(s) each occurs.

If the matching is successful, a deviation angle is found and, therefore, a new resulting yaw-angle for each of the turbulence intensity estimation values is found.

According to an embodiment of the method, the new result yaw-angle is stored in a look-up table and, in step c., said wind turbine is instructed to align according to a respective new result yaw-angle from the look-up table.

For a plurality of discrete yaw-angles turbulence intensity detection values and turbulence intensity estimation values may be stored once the matching process is finished, preferably the turbulence intensity estimation values are replaced by the turbulence intensity detection values. Additionally, the turbulence intensity estimation values may be replaced by the turbulence intensity detection values. Moreover, the maximum deviation threshold may be reduced if the deviation between the turbulence intensity values of the detection and the estimation is smaller.

According to an embodiment of the method, said received wind data includes wind direction and wind speed, and preferably at least one of the following information:
  landscape effects;
  mechanical load for said wind turbine's tower; and
  ratio of rotor rotation speed and wind turbine electrical power output.

To carry out the method only wind direction and wind speed are necessary. Nonetheless performance, efficiency and/or speed of re-calibration may be enhanced with having additional landscape effect information and/or wake influence information. For keeping the load for the mechanical means of a wind turbine such as the tower and the bearings as well as the generator and other parts, in particular the rotor blades, this information may also be used to enhance performance of the re-calibration methods.

According to an embodiment of the method, said calculation of an appropriate yaw-angle in step b. is based on at least one of the following information:
  pseudo-mast wind data;
  required electrical power output;
  requested wind park electrical power output, the wind park having a plurality of wind turbines;
  result of a simulation of electrical power output, preferably with SCADA; and
  wake effect optimization for a wind park having a plurality of wind turbines.

Turbulence intensity (TI) information is used to construct "pseudo met mast" data, providing an alternative and unbiased source of weather data at site. A dynamic list of turbines facing free-wind conditions is obtained, and the environmental-sensors measurements from the turbines belonging to this list are averaged. Stochastic fluctuations of the measurement from individual nacelle anemometers and wind vane sensors are mitigated by means of averaging the readings from multiple turbines. The developed procedure supplies a robust park-level reference for wind-related quantities (speed, direction) in absence of and/or in addition to permanent met mast information. A proper calibration of the turbine-level nacelle direction readings should be ensured. Being able to dynamically track TI profile changes, and to redefine for each turbine free-wind sectors accordingly, the "pseudo met mast" procedure delivers data that is free from biases due to wake effects, independent of turbine curtailments or downtimes, as well as of non-standard park control operations (like those related to wake management procedures).

The required electrical power output is a requirement on that respective wind turbine. Information from other wind turbines or an overall wind park optimization is not being considered. Rather, this may be a maximum or minimum value to run the wind turbine in a safe and efficient mode.

To the contrary, the requested wind park electrical power output is an information under consideration of the actual performance or according to a simulation estimated performance of the other wind turbines in a wind park. However, in this context, still this is wind turbine specific information which preferably is already broken down to a value identical to previously mentioned required electrical power output.

According to a preferred embodiment, the corresponding data are collected and recorded by a Supervisory Control and Data Acquisition System (SCADA). SCADA data are available both online for real-time monitoring at site, and offline for detailed data analytics.

The wake effect optimization includes information on potentially effecting wind turbines, whether being in operation or under curtailment and/or simulations of the wake effects. In particular, the wind turbine being at present wind condition an effecting wind turbine for another (neighboring) wind turbine may be slightly misaligned to the present wind direction in order to reduce the wake effect to that other wind turbine. In sum, the electrical power output is equal or even higher and/or the mechanical load for at least one of the respective wind turbines is reduced.

According to another aspect of the invention, a system is provided for re-calibrating at least one yaw-angle of a wind turbine according to the method according to one of above embodiments, wherein the system comprises at least the following means:
  a wind turbine having a rotor and having a yaw-angle drive to move said rotor into a yaw-angle position;
  at least one wind sensor to retrieve required wind data;
  at least one processor for carrying out all or some of the calculation operations;
  at least one storage device for at least transitionally storing all or some of the data to be stored;
  at least one sensor data input device for preparing sensor data for calculating steps;
  at least one drive output device for instructing said yaw-angle drive for yaw-angle alignment.

The system is arranged to carry out the methods as described above and it may include one wind turbine or a plurality of wind turbines as well as it may be incorporated in a wind turbine. For the system being incorporated in a wind turbine preferably the method is entirely carried out within the wind turbine. That means, the method is carried out without communication with an outside calculation center. However, for many applications it may be useful to receive wind data from outside sensors or being already prepared for carrying out the methods by an outside calculation entity.

Preferably, the at least one wind sensor is located on top of the wind turbine and is implemented by wind vanes and/or anemometers. For the processing and storage devices reference is made to well-known devices (cf. below). The sensor data input device preferably has a device for communicating with a sensor and is in particular arranged to receive analogue data and to calculate discrete or digital values appropriate for calculation within the processor. The drive output device similarly is arranged for communication with a drive or drive system wherein the output signal may be at lowest machine level, such as a particular voltage or current, or maybe on a higher level to communicate with a drive control of the yaw-angle drive.

According to an embodiment the system being implemented into a wind park having a plurality of wind turbines, and the wind park having a plurality of wind sensors, the wind sensors being based on a plurality of said wind turbines of that wind park to allow calculation of pseudo met mast wind data.

In a preferred embodiment, every or most wind turbines are equipped with several environmental sensors, measuring wind speed, wind direction, external temperatures and so on. These together with the produced power, the generator and rotor speeds readings, and the overall settings used to control the operation of the wind turbine, are used to monitor each wind turbine's operational status. Based on this available sensor information, preferably turbulence intensity (TI) information is used to construct "pseudo met mast" data as described above. A met mast upstream the wind park is not required and, hence, delay and landscape effect simulation being computational expensive and/or not too exact can be omitted.

According to yet another aspect of the invention a computer-implemented method for wind park optimization is provided, wherein the wind park includes a plurality of wind turbines, and wherein at least an effecting wind turbine might suffer from wake from at least an effected wind turbine while being aligned to at least one yaw-angle position, the method comprising at least the following steps:

I. based on simulation calculation including turbulence intensity estimation values estimating said at least one effecting wind turbine to suffer from wake from said at least one effected wind turbine;

II. based on simulation calculation including turbulence intensity estimation values estimating said at least one effected wind turbine to cause the wake on said estimated at least one effecting wind turbine;

III. based on wind sensor data calculating turbulence intensity detection values for said estimated at least one effecting wind turbine and said estimated at least one effected wind turbine;

IV. comparing the turbulence intensity estimation values with the respective turbulence intensity detection values and calculating respective turbulence intensity deviation values;

V. if said turbulence intensity deviation value of one of said wind turbines is above a pre-determined deviation threshold, that wind turbine is set a deviating wind turbine;

VI. for said deviating wind turbine searching a matching yaw-angle having a turbulence intensity estimation value that matches with said turbulence intensity detection value;

VII. if a matching yaw-angle is found, instructing said deviating wind turbine to align according to that matching yaw-angle.

Contrary to any prior approach here turbulence intensity is used to define the wake effects of the wind turbines in the wind park. This allows a very cost-efficient approach while at the same time gusts only have little or no effect on the calculation of the turbulence intensity. This is because the turbulence intensity of the gust usually is only high at the beginning and at the end of the gust. Therefore, for long gusts turbulence intensity has little influence on the ratio of standard deviation and average wind speed in a pre-determined period of time. During that period of time, the turbulence intensity of the long-term gust, thus, only has result changing influence in the short wind speed acceleration period. Moreover, for short-term gusts, for example for the duration of below a few seconds, by calculating the turbulence intensity over an average of a predetermined period of time, e.g. 10 minutes, they do have little influence, too, even if the turbulence intensity rises sharply in that short period of the sudden gust.

Therefore, the deficits of only looking at the wind speed or even at the electrical power output can be overcome by using the turbulence intensity detection. Additionally, this will result in a better re-calibration for a single wind turbine, because in this method the effect of the wind turbine of the wind park is additionally considered and allows for fast and highly precise alignment of the plurality of wind turbines. Even for highly complex wind direction and wake spread behavior due to landscape effects or a large number of gusts having a deviating wind direction, the new alignments to the matching yaw-angle is secure and precise.

According to an embodiment of the method, the turbulence intensity detection values are mapped for at least both said at least one effecting wind turbine and said at least one effected wind turbine, and wherein said matching yaw-angle is an alignment yaw-angle, and the alignment yaw-angle being a yaw-angle at which maximum peaks of the respective mapped turbulence intensity detection values of both said at least one effecting wind turbine and said at least one effected wind turbine at least are located within an threshold area around a straight line through the respective at least two wind turbine's yaw-angle rotation centers.

In this embodiment of the method the peaks of the turbulence intensity detection values of the neighboring wind turbines, i.e. the effecting wind turbine being located upstream at the present wind direction and, thus, causing the wake and the other wind turbine being the effected wind turbine being located downstream and suffering from the on-coming wake from the at least one (upstream) effecting wind turbine, are located. If the peak of the turbulence intensity detection value points to the peak of the effected wind turbine's turbulence intensity detection values, at high probability this should be the correct alignment for receiving the highest performance.

It may be appreciated that every new alignment may be carried out when orientation is changed, change of wind direction occurs, or change of peak alignment is detected. Therefore, optimization of the wind turbine orientation for showing high performance as to say a high electrical power outputs, is carried out frequently and, already, for minor deviations at high precision.

According to yet another aspect of the invention a wind park is provided, including a management system for optimizing that wind park according to an embodiment of the method for wind park optimization, the wind park comprises at least the following means:

a plurality of wind turbines each having a rotor and having a yaw-angle drive to move said rotor into an yaw-angle position;

at least one wind sensor to retrieve required wind data;

at least one processor for carrying out all or some of the calculation operations;

at least one storage device for at least transitionally storing all or some of the data to be stored;

at least one sensor data input device for preparing sensor data for calculating steps;

at least one drive output device for instructing said yaw-angle drive for yaw-angle alignment.

The wind park is arranged to carry out the method for wind park optimization as described above. The wind park includes a plurality of wind turbines, which at least in occurrence of rather rare wind directions effect each other with wake. For the means of the wind turbine reference is made to the above description of the wind turbine. It may be appreciated, that it is not necessary that each of the wind turbines has a wind sensor, a storage device, a processor, a sensor data input device or a drive output device. Instead all or some of it may be located outside the wind turbine. However, in a preferred embodiment each of the wind turbines includes such means and optimization is carried out decentralized and, therefore, close to the wind sensors of the wind turbine, resulting in quick re-alignment to achieve long terms of high performance.

According to an embodiment of the wind park, re-calibration of a yaw-angle of a single wind turbine is carried out according to an embodiment of above described method for re-calibrating at least one yaw-angle of a wind turbine, and preferably that re-calibration method being carried out within that single wind turbine without data output to another wind turbine or to a wind park management center.

It may be appreciated that re-calibration and optimization are two different purposes. The re-calibration merely allows clean alignment of the rotor toward to the present wind condition without exactly knowing the wind condition at the respective wind turbine. On the other hand, the optimization includes deviating from the maximum electrical power output of a single wind turbine to allow for reduced mechanic load on that wind turbine compensated by electrical power output(s) of downstream wind turbine(s) due to a reduced wake effect. Such measures are for example choosing a lower blade angle and/or aligning a wind turbine to and yaw-angle slightly deviating to the wind direction, i.e. slight misalignment, so that the wake effect onto downstream wind turbine(s) is reduced.

According to an embodiment of the wind park, the wind park comprises a management center to carry out all or some of the wind park optimization calculations.

Within the management center, displays and printers for human interaction as well as interfaces and data recordings may be available for managing electrical power consumption requests with human interaction. Such a management center may be situated rather distant from the wind park and/or a plurality of wind parks are being managed from that management center. The management center may also be arranged to receive information based on which the re-calibration method of wind turbine(s) can be carried out under human control and/or may be arranged to carry out the calculations necessary for that re-calibration method. For these purposes, the management center comprises processes and storages as they are being used at present or according to future developments.

Furthermore, the invention provides a computer-readable medium comprising above described method for re-calibrating at least one yaw-angle of a wind turbine being readable by a computing means implemented into a wind turbine or into a system for re-calibrating at least one yaw-angle of a wind turbine, preferably according to an embodiment of above described system for re-calibrating at least one yaw-angle of a wind turbine, and/or implemented into a wind park, preferably according to an embodiment of above described wind park including a management system for optimizing that wind park.

Last, the invention provides a computer-readable medium comprising an embodiment of above described method for wind park optimization, being readable by a computing means implemented into a wind park, preferably according to an embodiment of above described including a management system for optimizing that wind park.

As used herein, the term "computer-readable medium" is intended to be representative of any tangible computer-based device implemented in any method or technology for short-term and long-term storage of information, such as, computer-readable instructions, data structures, program modules and submodules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "computer-readable medium" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, a processor may include any programmable system including systems using microcontrollers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database.

In one embodiment, a computer program is provided, and the program is embodied on a computer readable medium. In an exemplary embodiment, the system is executed on a single computer system, without requiring a connection to a server computer. The application preferably is flexible and designed to run in different environments without compromising any major functionality. In some embodiments, the system includes multiple components distributed among a plurality of computing devices. One or more components may be in the form of computer-executable instructions embodied in a computer-readable medium.

BRIEF DESCRIPTION OF THE DRAWINGS

Various features, aspects, and advantages will become better understood when the following detailed description is read with reference to the accompanying drawings in which like characters represent like parts throughout the drawings, wherein.

BEST MODE TO CARRY OUT THE INVENTION

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. The singular forms "a", "an", and "the" include plural references unless the context clearly dictates otherwise.

Figure 1:
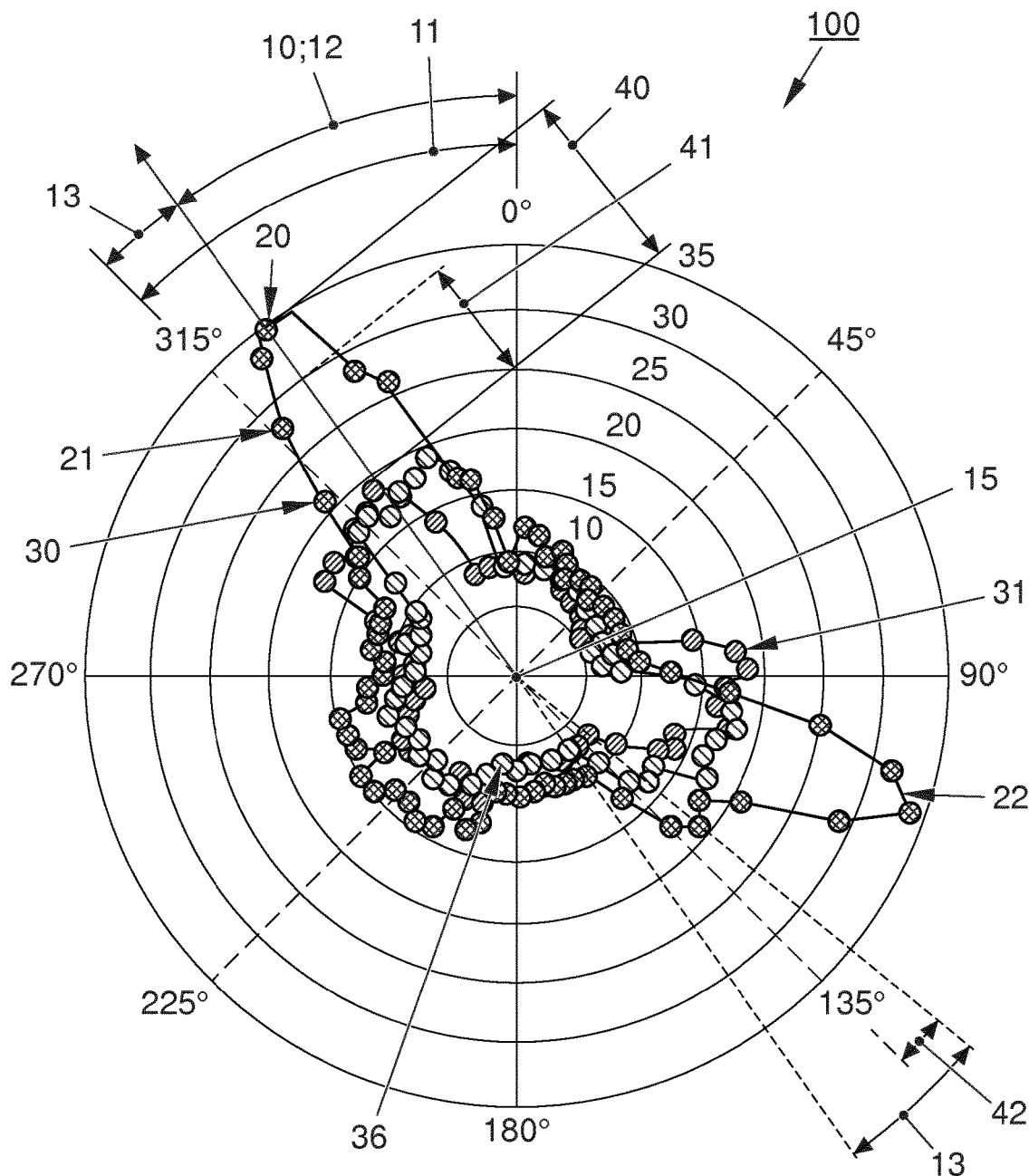
FIG. 1 shows a polar diagram on TI data based re-calibration of a wind turbine.

FIG. 1 shows a polar diagram on turbulence intensity data based re-calibration of a wind turbine 100. The turbulence intensity data being diagrammed according to the respective yaw-angle shows three different profiles: the turbulence intensity estimation value profile 22, the (misaligned) turbulence intensity estimation value profile 31 and the aligned turbulence intensity estimation value profile 36. The simulation results in a yaw-angle 10, here 330°. After applying that yaw-angle 10, it is found that the turbulence intensity detection value 30 does not match with the turbulence intensity estimation value 20, as it is clearly exceeding the deviation threshold 41. Then a matching turbulence intensity estimation value 21 is found corresponding to a matching yaw-angle 11, here 315°. The deviation angle 13 is calculated, here −15°, resulting from 330° (matching yaw-angle 11) subtracted from 330° (initially calculated yaw-angle 10). Now, the wind turbine is rotated to the line with the replacement yaw-angle 12. As the maximum angle deviation is mostly known, alignment to a backside yaw-angle, here between 45° and 135°, is prohibited.

According to a method showing an even better performance or security in performing appropriately, not only one single turbulence intensity value is compared to each other, but a plurality of turbulence intensity values. Here this is being represented by a mapping threshold 42 being shown as an angle value. In this example, the deviation angle 13 exceeds the mapping threshold 42 and matching of a plurality of turbulence intensity estimation values with turbulence intensity detection values results in the new alignment to, in this case, identical replacement yaw-angle 12.

Figure 2:
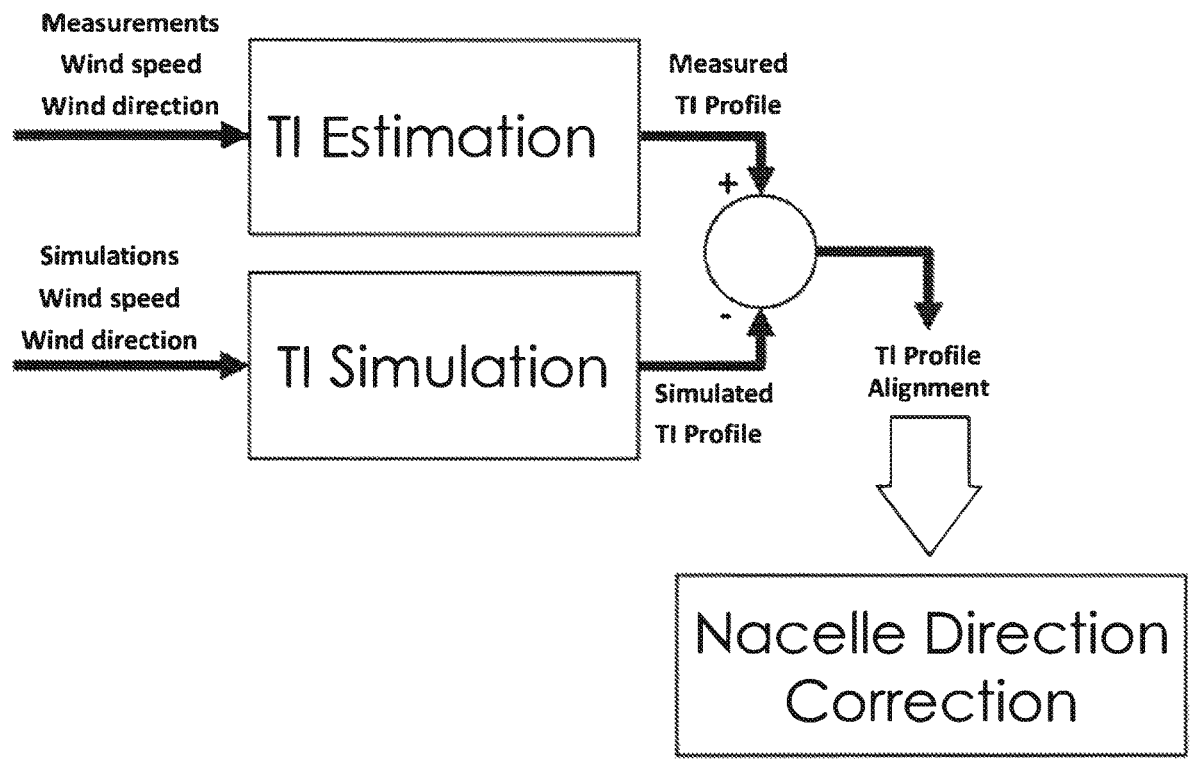
FIG. 2 shows an example flow diagram on the re-calibration process.

FIG. 2 shows a flow diagram on the simple methods as explains with regard to FIG. 1. Here simulation and measurement is carried out to find the turbulence intensity and to map these turbulence intensities to the simulation values based on the turbulence intensity detection value profile and the turbulence intensity estimation value profile. After alignment of the profiles with respect to each other (cf. FIG. 1), the nacelle direction, i.e. the yaw-angle, is corrected.

Figure 3:
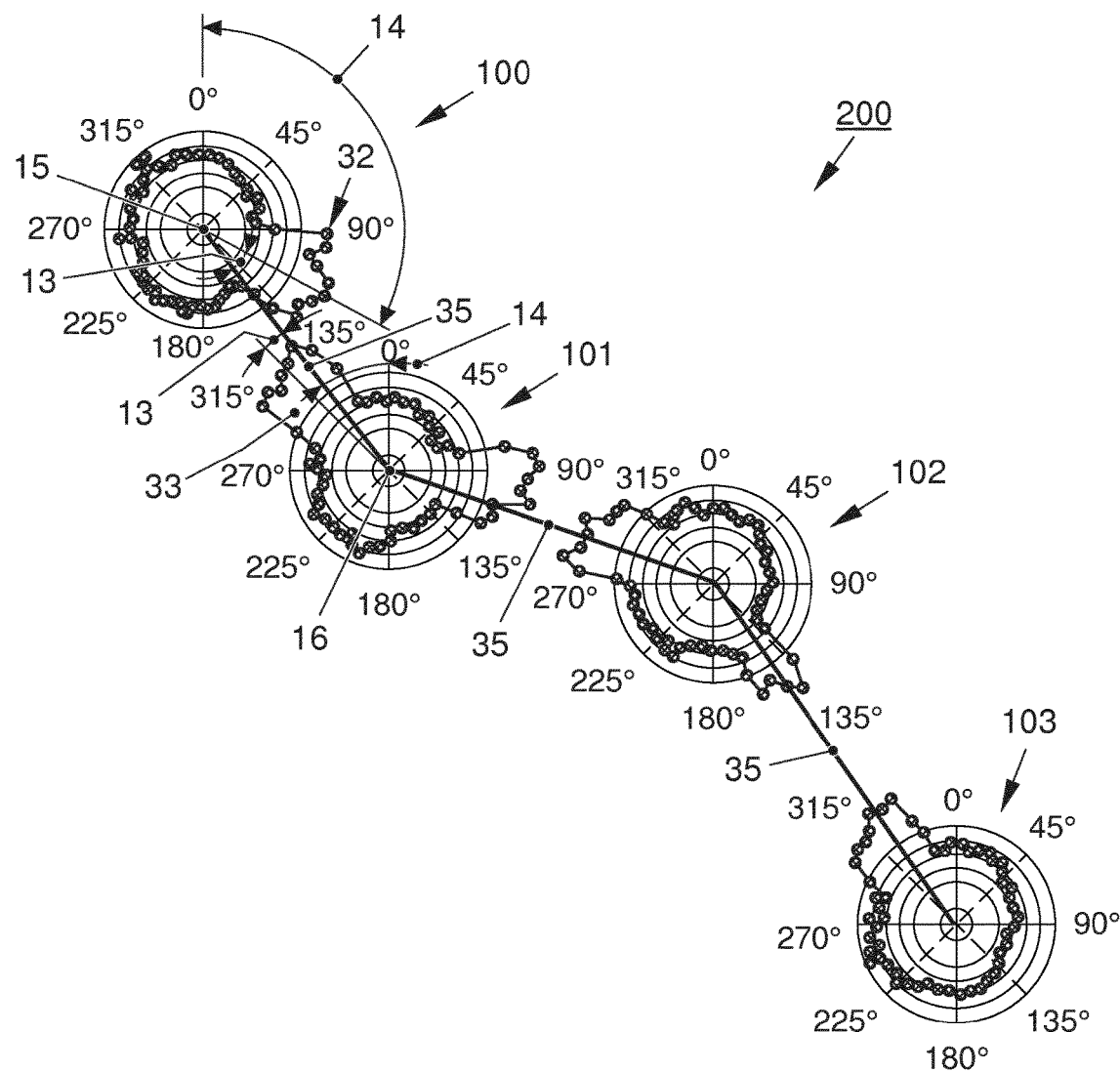
FIG. 3 shows a plurality of wind turbines suffering from wake effects being misaligned with respect to each other.
Figure 4:
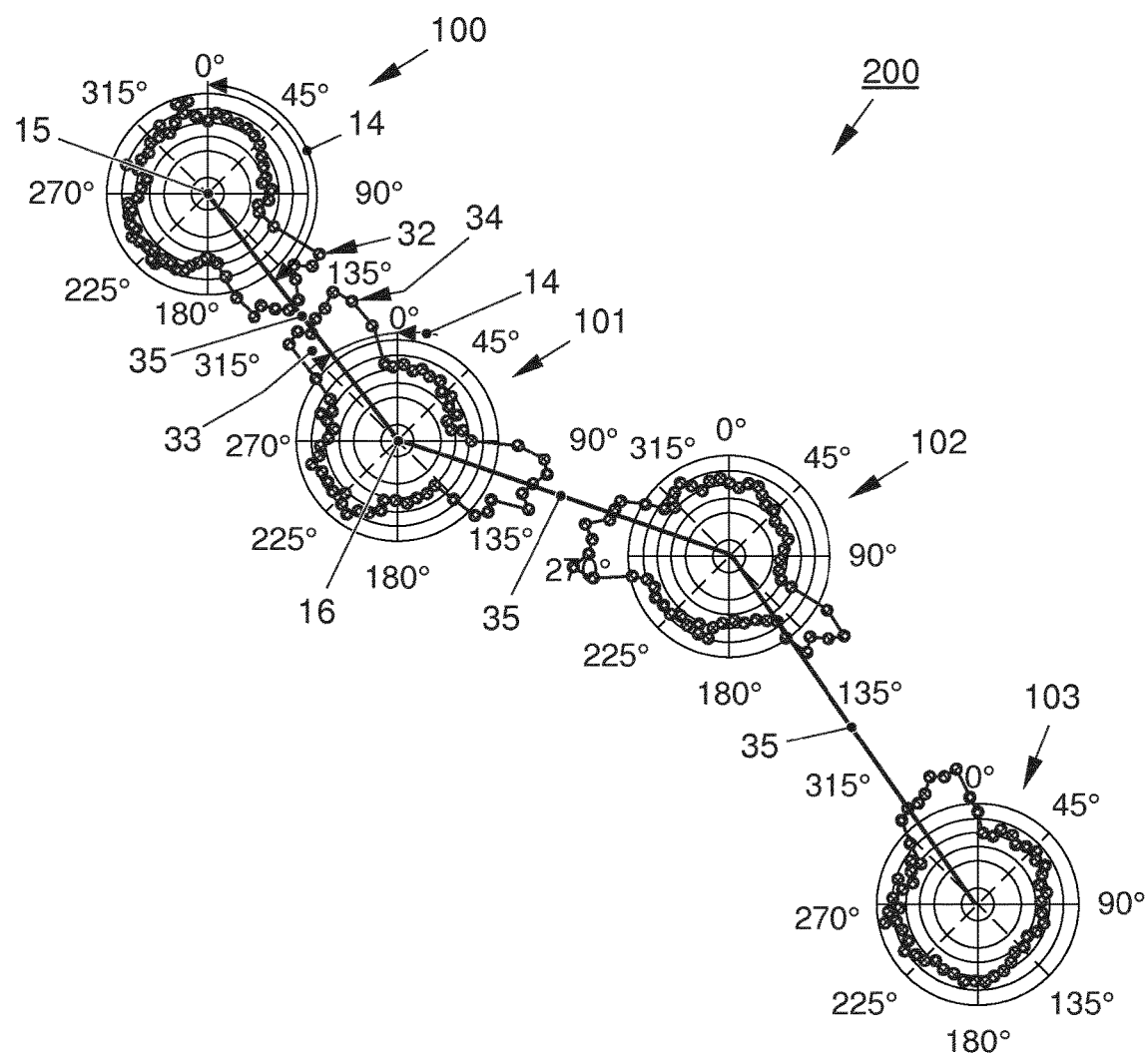
FIG. 4 shows a plurality of wind turbines suffering from wake effects where the alignment of each wind turbine is aligned with respect to each other.

FIGS. 3 and 4 show a wind park 200 having a first wind turbine 100, a second wind turbine 101, a third wind turbine 102 and a fourth wind turbine 103 effecting each other at the present wind direction. As one can see, in FIG. 3 the wind turbines 100 to 103 are misaligned with respect to a straight line 35 connecting the rotation centers 15 and 16 of the respective wind turbines 100 and 101, and for the third and fourth wind turbines, respectively. According to the straight line 35, the effecting maximum peak 32 of first wind turbine 100 should align with alignment yaw-angle 14 but does deviates by deviation angle 13. Similar this is the case for second wind turbine 101. Now in FIG. 4, alignment of the effecting maximum peak 32 of the first wind turbine 100 and effected maximum peak 33 of the second wind turbine 101 are within a threshold area 34 around the straight line 35. Therefore, the alignment of the wind turbines to each other is optimized according to that present wind condition.

Figure 5:
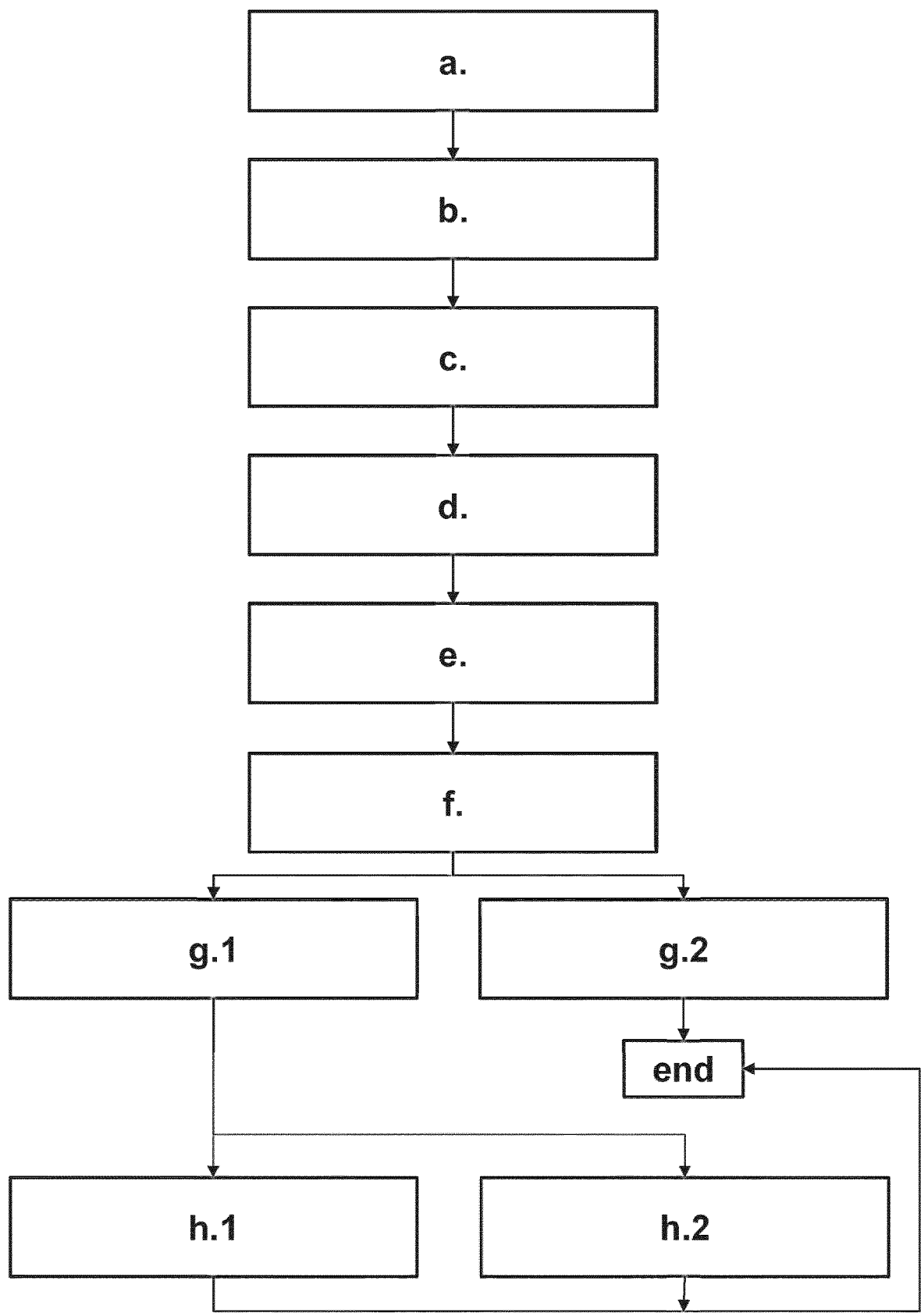
FIG. 5 shows a preferred embodiment of the re-calibration method based on TI information.

FIG. 5 shows a flow-diagram having the following steps for re-calibrating a wind turbine:
a. receiving wind data;
b. based on at least said wind data:
  calculating an appropriate yaw-angle 10, and
  determining a turbulence intensity estimation value 20 related to said appropriate yaw-angle 10, wherein the turbulence intensity TI being a ratio of wind speed deviation to average wind speed over a pre-determined period of time;
c. instructing said wind turbine 100 to align according to said calculated yaw-angle 10;
d. after attainment of said yaw-angle 10 alignment, retrieving wind turbine 100 specific wind speed data;
e. based on said retrieved wind turbine 100 specific wind data, calculating a turbulence intensity detection value 30;
f. comparing said turbulence intensity detection value 30 with said turbulence intensity estimation value 20 and calculating a turbulence intensity deviation value 40;
g.1 in case, said turbulence intensity deviation value 40 is above a pre-determined deviation threshold 41, a matching yaw-angle 11 is searched for having a turbulence intensity estimation value 21 that matches with said turbulence intensity detection value 30;
h.1 in case, a matching yaw-angle 11 is found, said wind turbine 100 is instructed to align according to that matching yaw-angle 11. Afterwards, method is ended until wind data input changes.

For the alternative decisions in steps g. and h. in the method according to FIG. 5, the following steps are being carried out:
g.2 however in case, said turbulence intensity deviation value 40 is below a pre-determined deviation threshold 41, method is ended and calibration is assumed to be correct.
h.2 however, in rare cases, a matching yaw-angle 11 cannot be found; then method is ended. Preferably, the method outputs an error signal.

Figure 6:
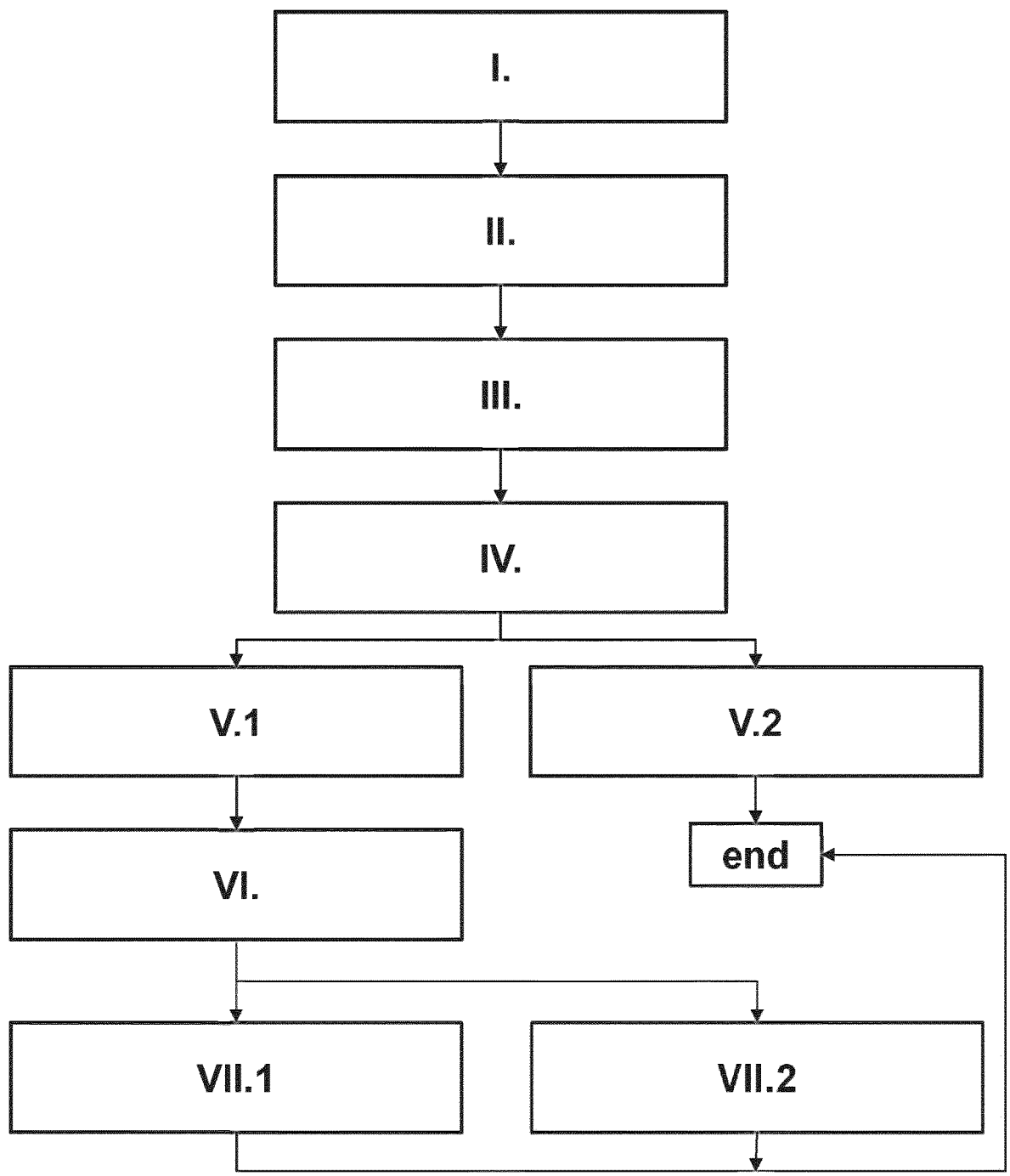
FIG. 6 shows a preferred embodiment of the wind park optimization method based on TI information.

FIG. 6 shows a flow-diagram having the following steps for optimizing a wind turbine within a wind park:
I. based on simulation calculation including turbulence intensity estimation values 20 estimating said at least one effecting wind turbine 101,102,103 to suffer from wake from said at least one effected wind turbine 100,101,102;

II. based on simulation calculation including turbulence intensity estimation values 20 estimating said at least one effected wind turbine 100,101,102 to cause the wake on said estimated at least one effecting wind turbine 101,102,103;

III. based on wind sensor data calculating turbulence intensity detection values 30 for said estimated at least one effecting wind turbine 101,102,103 and said estimated at least one effected wind turbine 100,101,102;

IV. comparing the turbulence intensity estimation values 20 with the respective turbulence intensity detection values 30 and calculating respective turbulence intensity deviation values 40;

V.1 in case, said turbulence intensity deviation value 40 of one of said wind turbines 100,101,102,103 is above a pre-determined deviation threshold 41, that wind turbine 100,101,102,103 is set a deviating wind turbine 110,111, 112,113; in the other case, see below step V.2;

VI. in case of step V.1, for said deviating wind turbine 110,111,112,113 a matching yaw-angle 11 is searched for having a turbulence intensity estimation value 21 that matches with said turbulence intensity detection value 30;

VII.1 after step VI. in case, a matching yaw-angle 11 is found, said deviating wind turbine 100 is instructed to align according to that matching yaw-angle 11; in the other case, see below step VII.2.

For the alternative decisions in steps V. and VII. in the method according to FIG. 6, the following steps are being carried out:

V.2 However in case after step IV., if said turbulence intensity deviation value 40 of one of said wind turbines 100,101,102,103 is below a pre-determined deviation threshold 41, method is ended and orientation is assumed to be at optimum.

VII.2 However after step VI. in the rare case, that a matching yaw-angle 11 cannot be found, method is ended. Preferably, the method outputs an error signal.

Figure 7:
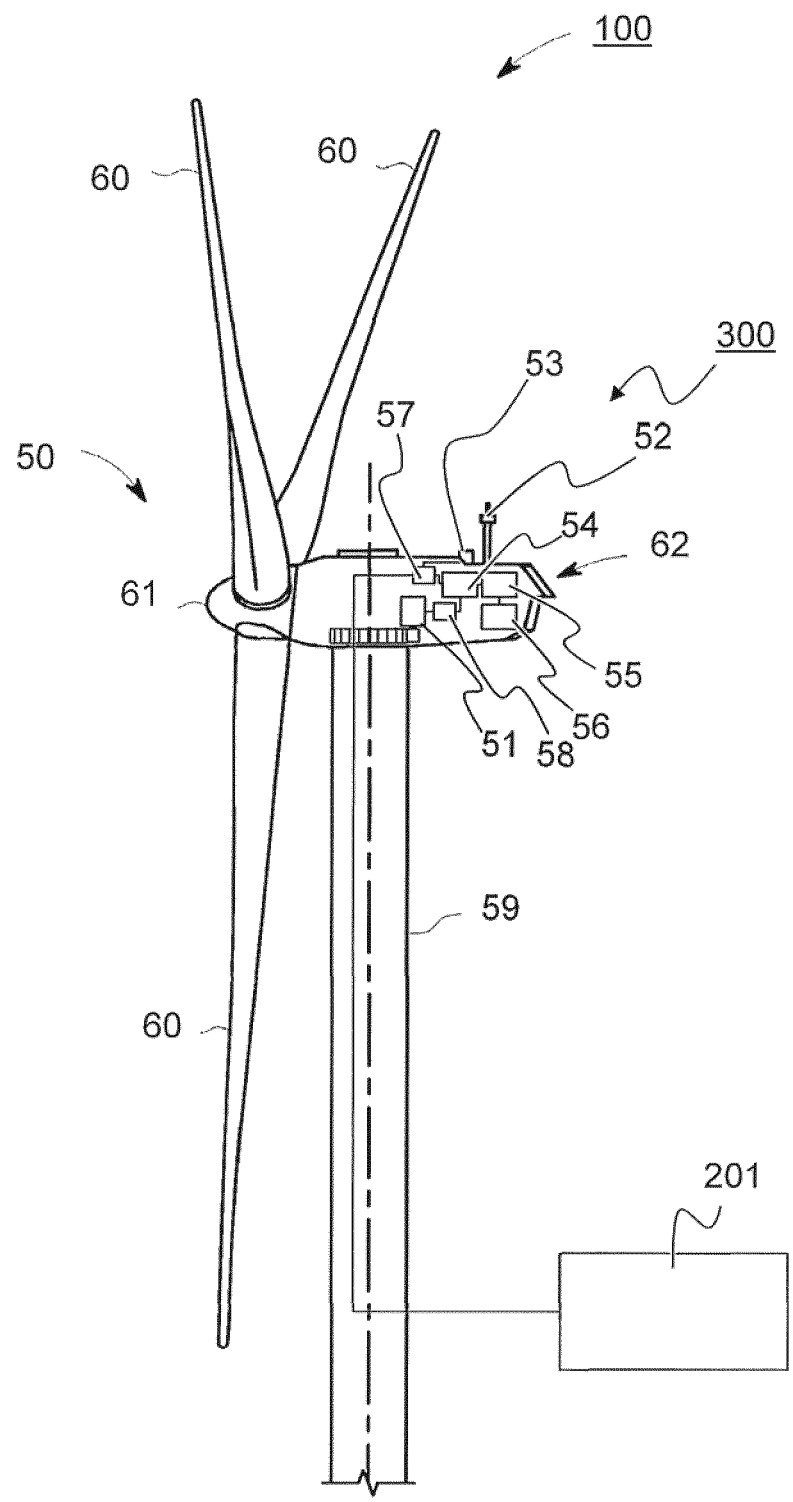
FIG. 7 shows a wind turbine.

FIG. 7 shows a wind turbine 100 having a rotor 50 with three turbine blades 60 fixed to a central turbine hub 61. Rotor 50 is located at the front side of a nacelle 62. Nacelle 62 is located on top of a wind turbine tower 59 and can be turned to align rotor 50 with a current wind direction via yaw-angle drive 51. In this example, on top of nacelle 62 a first wind sensor 52, e.g. an anemometer, and a second wind sensor 53, e.g. a wind vane, is situated downstream rotor 50. Further, nacelle 62 houses besides a generator (not shown) a system for re-calibration 300, preferably to carry out above described re-calibration method. System for re-calibration 300 comprises a processor 54, a transitional storage device 55, a non-transitional storage device 56, a sensor data input device 57, a drive output device 58. The devices comprised in the system for re-calibration 300 may also have other functions for purposes other than calibration. Processor 54 makes use of storage devices 55 and 56, appropriately and communicates via sensor data input device 57 with first and second wind sensors 52 and 53. Further, processor 54 communicates via drive output device 58 with yaw-angle drive 51 to adjust the alignment of rotor 50. Optionally, in addition processor 54 may communicate with a wind park management center 201 or directly with another wind turbine.

REFERENCE LIST

10 yaw-angle
11 matching yaw-angle
12 replacement yaw-angle
13 deviation angle
14 alignment yaw-angle
15 first yaw-angle rotation center
16 second yaw-angle rotation center
20 turbulence intensity estimation value
21 matching turbulence intensity estimation value
22 turbulence intensity estimation value profile
30 turbulence intensity detection value
31 misaligned turbulence intensity detection value profile
32 effecting maximum peak
33 effected maximum peak
34 threshold area
35 straight line
36 aligned turbulence intensity estimation value profile
40 turbulence intensity deviation value
41 deviation threshold
42 mapping threshold
50 rotor
51 yaw-angle drive
52 first wind sensor
53 second wind sensor
54 processor
55 transitional storage device
56 non-transitional storage device
57 sensor data input device
58 drive output device
59 wind turbine tower
60 turbine blade
61 turbine hub
62 nacelle
100 first wind turbine
101 second wind turbine
102 third wind turbine
103 fourth wind turbine
200 wind park
201 wind park management center
300 system for re-calibration
TI turbulence intensity

The invention claimed is:

1. A computer-implemented method for re-calibrating at least one yaw-angle of a wind turbine starting from an initial yaw-angle calibration of said wind turbine, the method comprising at least the following steps:
   a. receiving wind data;
   b. based on at least said wind data:
      calculating an appropriate yaw-angle, and
      determining a turbulence intensity estimation value related to said appropriate yaw-angle, wherein the turbulence intensity (TI) being a ratio of wind speed deviation to average wind speed over a pre-determined period of time;
   c. instructing said wind turbine to align according to said calculated yaw-angle;
   d. after attainment of said yaw-angle alignment, retrieving wind turbine specific wind speed data;
   e. based on said retrieved wind turbine specific wind data, calculating a turbulence intensity detection value;
   f. comparing said turbulence intensity detection value with said turbulence intensity estimation value and calculating a turbulence intensity deviation value;
   g. if said turbulence intensity deviation value is above a pre-determined deviation threshold, searching a matching yaw-angle having a turbulence intensity estimation value that matches with said turbulence intensity detection value;
   h. if a matching yaw-angle is found, instructing said wind turbine to align according to that matching yaw-angle;

i. after having retrieved at least one turbulence intensity detection value for a plurality of distinct yaw-angles each, mapping these turbulence intensity detection values and comparing them to mapped turbulence intensity estimation values;

j. if one turbulence intensity detection value matches with a turbulence intensity estimation value, calculating a deviation angle between the yaw-angle related to the turbulence intensity detection value and the yaw-angle related to turbulence intensity estimation value;

k. applying said deviation angle to the entire mapped turbulence intensity estimation values and newly associating them to a corresponding new result yaw-angles being each the sum of estimated yaw-angle and said deviation angle;

l. comparing at least some of the plurality of mapped turbulence intensity detection values with that mapped turbulence intensity estimation value being newly associated to the respective result yaw-angle; and, m. if a pre-determined number of said plurality of mapped turbulence intensity detection values is within a mapping threshold, storing that deviation angle and adding that deviation angle to each appropriate yaw-angle calculated in step b. and instructing said wind turbine based on the new result yaw-angle.

2. The method of claim 1, further comprising the following steps:

storing said matching yaw-angle as replacement yaw-angle for said appropriate yaw-angle calculated in step a. in a look-up table, and for an operation condition of said wind turbine, where that same appropriate yaw-angle is calculated as being appropriate, instructing said wind turbine to align according to that replacement yaw-angle.

3. The method of claim 1, wherein the new result yaw-angle is stored in a look-up table and, in step c., said wind turbine is instructed to align according to a respective new result yaw-angle from the look-up table.

4. The method of claim 1, wherein said received wind data includes wind direction and wind speed.

5. The method of claim 4, wherein said received wind data includes:

landscape effects;

wake influence from at least one neighboring wind turbine;

mechanical load for said wind turbine's tower; and ratio of rotor rotation speed and wind turbine electrical power output.

6. The method of claim 1, wherein said calculation of an appropriate yaw-angle in step b. is based on at least one of the following information:

pseudo-mast wind data;

required electrical power output;

requested wind park electrical power output, the wind park having a plurality of wind turbines;

result of a simulation of electrical power output; and, wake effect optimization for a wind park having a plurality of wind turbines.

7. A system for re-calibrating at least one yaw-angle of a wind turbine according to the method of claim 1, the system comprising:

a wind turbine having a rotor and having a yaw-angle drive to move said rotor into a yaw-angle position;

at least one wind sensor to retrieve required wind data;

at least one processor for carrying out all or some of the calculation operations;

at least one storage device for at least transitionally storing all or some of the data to be stored;

at least one sensor data input device for preparing sensor data for calculating steps;

at least one drive output device for instructing said yaw-angle drive for yaw-angle alignment.

8. The system of claim 7, being implemented into a wind park having a plurality of wind turbines, and the wind park having a plurality of wind sensors, the wind sensors being based on a plurality of said wind turbines of that wind park to allow calculation of pseudo-mast wind data.

* * * * *